United States Patent [19]

O'Brien et al.

[11] Patent Number: 5,678,076
[45] Date of Patent: Oct. 14, 1997

[54] STACKED MULTI-LAMP FLASH WHEELS AND CAMERA

[75] Inventors: Michael Joseph O'Brien, Rochester; Robert Cooper Bryant, Honeoye Falls; Richard Alexander Colleluori, Rochester, all of N.Y.

[73] Assignee: Eastman Kodak Company, Rochester, N.Y.

[21] Appl. No.: 665,069

[22] Filed: Jun. 11, 1996

[51] Int. Cl.[6] .................................................. G03B 15/03
[52] U.S. Cl. ........................... 396/192; 396/193; 396/197
[58] Field of Search .............................. 362/14; 396/192, 396/193, 197

[56] References Cited

U.S. PATENT DOCUMENTS

| | | |
|---|---|---|
| 3,418,906 | 12/1968 | Wick et al. . |
| 3,454,755 | 7/1969 | Wick et al. . |
| 3,866,033 | 2/1975 | Stacy et al. . |
| 3,919,539 | 11/1975 | Winkler et al. ............................ 240/1.3 |
| 4,098,565 | 7/1978 | Van de Weijer ............................ 431/93 |
| 4,265,527 | 5/1981 | Engelsmann et al. .................... 354/144 |
| 4,347,053 | 8/1982 | Fohl et al. ................................ 431/359 |
| 4,565,431 | 1/1986 | Henley et al. ............................ 354/135 |

*Primary Examiner*—Michael L. Gellner
*Assistant Examiner*—Daniel Chapik
*Attorney, Agent, or Firm*—Roger A. Fields

[57] ABSTRACT

A camera for use with a first group of successive flash lamps and with a second group of successive flash lamps, comprises a flash emission window and means for moving the first lamp group relative to the second lamp group to move the respective lamps of the first lamp group to a use position at the flash emission window and for moving the first and second lamp groups in unison after the respective lamps of the first lamp group have been used in order to move the respective lamps of the second lamp group to a use position at the flash emission window.

10 Claims, 8 Drawing Sheets

STACKED MULTI-LAMP FLASH WHEELS AND CAMERA

CROSS-REFERENCE TO RELATED APPLICATION

Reference is made to commonly assigned copending application Ser. No. 08/642,138, entitled MULTI-LAMP FLASH WHEEL AND CAMERA and filed May 2, 1996 in the names of Robert C. Bryant, Richard A. Colleluori and Michael J. O'Brien.

FIELD OF THE INVENTION

The invention relates Generally to the field of photography, and in particular to stacked multi-lamp flash wheels and to a camera which uses the stacked multi-lamp flash wheels.

BACKGROUND OF THE INVENTION

It is known for a camera to be used with a multi-lamp flash wheel.

For example, prior art U.S. Pat. No. 4,098,565 issued Jul. 4, 1978 discloses a multi-lamp flash wheel in which the flash lamps are arranged radially in a circular array with respective ignition ends of the lamps being relatively close to one another and respective opposite ends of the lamps being relatively far from one another. The circular array of flash lamps is rotated inside a camera to advance the lamps successively into a slot-like recess at the front of the camera. Each one of the lamps is positioned in the recess with its opposite end protruding radially from the recess. A fixed, faceted reflector at opposite sides of the recess reflects flash illumination substantially radially from the lamp in the recess. A percussion spring is located to strike an ignition stem or ferrule of the lamp in the recess to ignite the lamp.

Somewhat similarly, prior art U.S. Pat. No. 4,347,053 issued Aug. 31, 1982 discloses a multi-lamp flash wheel in which the flash lamps are arranged radially in a circular array with respective ignition ends of the lamps being relatively close to one another and respective opposite ends of the lamps being relatively far from one another. In this instance, each one of the lamps is located in a separate combustion chamber. The rear of the chamber has a reflective coating which works in combination with a fixed reflector in a camera, when the circular array of flash lamps is rotated to advance the chambers successively to the fixed reflector, to reflect flash illumination substantially radially from the chambers.

SUMMARY OF THE INVENTION

According to one aspect of the invention, a multi-lamp flash assemblage comprises:

a first group of successive flash lamps;

a second group of successive flash lamps; and means supporting the first lamp group for movement relative to the second lamp group to move the respective lamps of the first lamp group to a use position, and for causing the first and second lamp groups to be moved in unison after the respective lamps of the first lamp group have been used in order to move the respective lamps of the second lamp group to a use position.

According to another aspect of the invention, a camera for use with a first group of successive flash lamps and with a second group of successive flash lamps, comprises:

a flash emission window; and means for moving the first lamp group relative to the second lamp group to move the respective lamps of the first lamp group to a use position at the flash emission window, and for moving the first and second lamp groups in unison after the respective lamps of the first lamp group have been used in order to move the respective lamps of the second lamp group to a use position at the flash emission window.

DETAILED DESCRIPTION OF THE INVENTION

Figure 1:
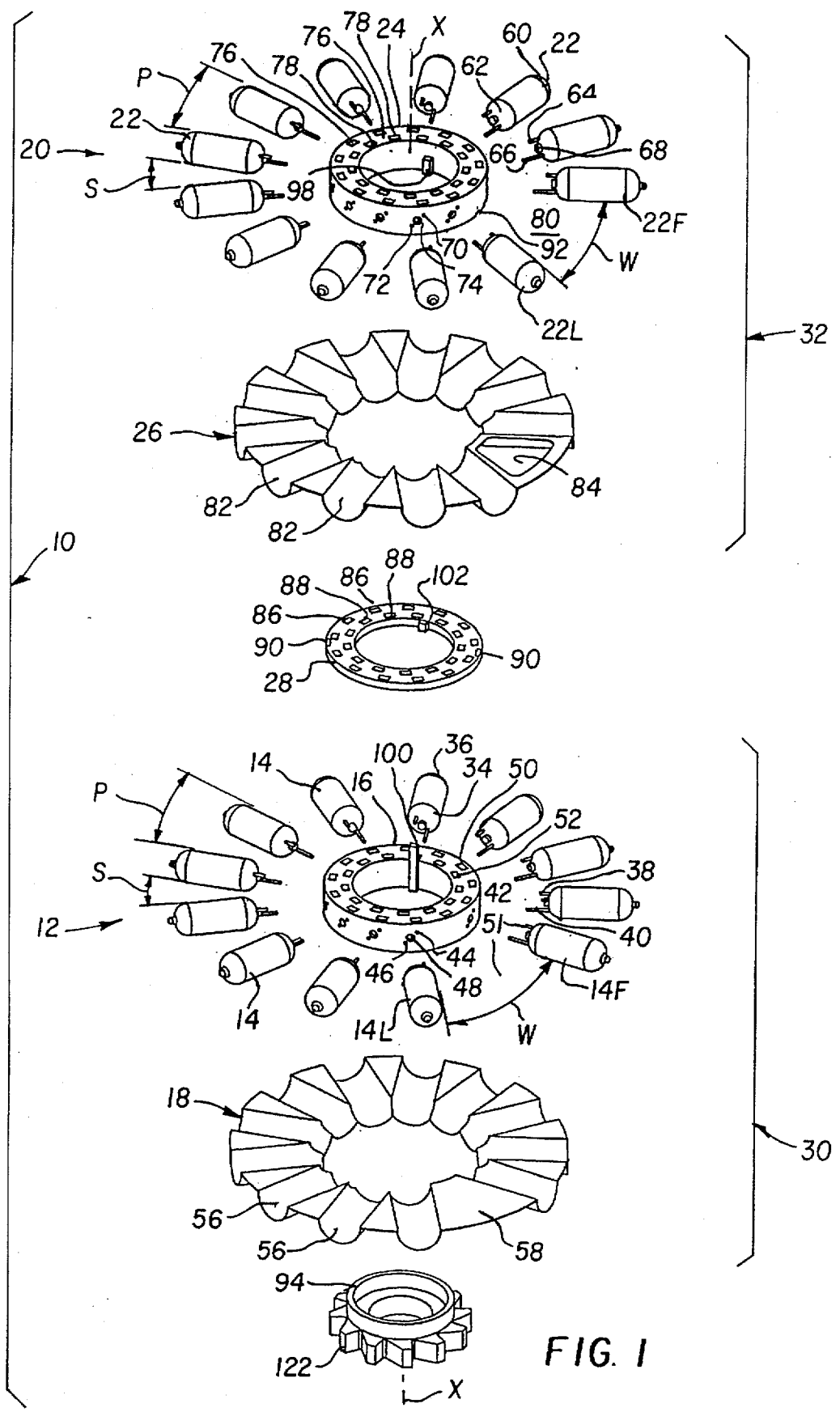
FIG. 1 is an exploded perspective view of a multi-lamp flash assemblage consistent with a preferred embodiment of the invention.

The invention is disclosed as being embodied preferably in a multi-lamp flash assemblage and in a camera which includes the multi-lamp flash assemblage. Because the features of a multi-lamp flash assemblage and a camera are generally known, the description which follows is directed in particular only to those elements forming part of or cooperating directly with the disclosed embodiment. It is to be understood, however, that other elements may take various forms known to a person of ordinary skill in the art.

The Multi-Lamp Flash Assemblage

Referring now to the drawings, FIGS. 1–5 show a multi-lamp flash assemblage 10 comprising a first circular array 12 of twelve electrically-ignitable flash lamps 14, a first annular support 16 for the flash lamps in the first circular array, a first reflector ring 18 for the flash lamps in the first circular array, a second circular array 20 of twelve electrically-ignitable flash lamps 22, a second annular support 24 for the flash lamps in the second circular array, a second reflector ring 26 for the flash lamps in the second circular array, and an intermediate annular support 28 contiguous with the first annular support and the second annular support. The first circular array 12 of flash lamps 14, the first annular support 16 and the first reflector ring 18 are connected together to rotate clockwise in FIG. 1 and counter-clockwise in FIG. 2 about a common center axis X as a first (to be used) multi-lamp flash wheel or unit 30. The second circular array 20 of flash lamps 22, the second annular support 24 and the second reflector ring 26 are connected together to rotate clockwise in FIG. 1 and counter-clockwise in FIG. 2 about the common center axis X as a second (to be used) multi-lamp flash wheel or unit 32. The two multi-lamp flash wheels 30 and 32 have some differences, but for the most part are similar.

Figure 2:
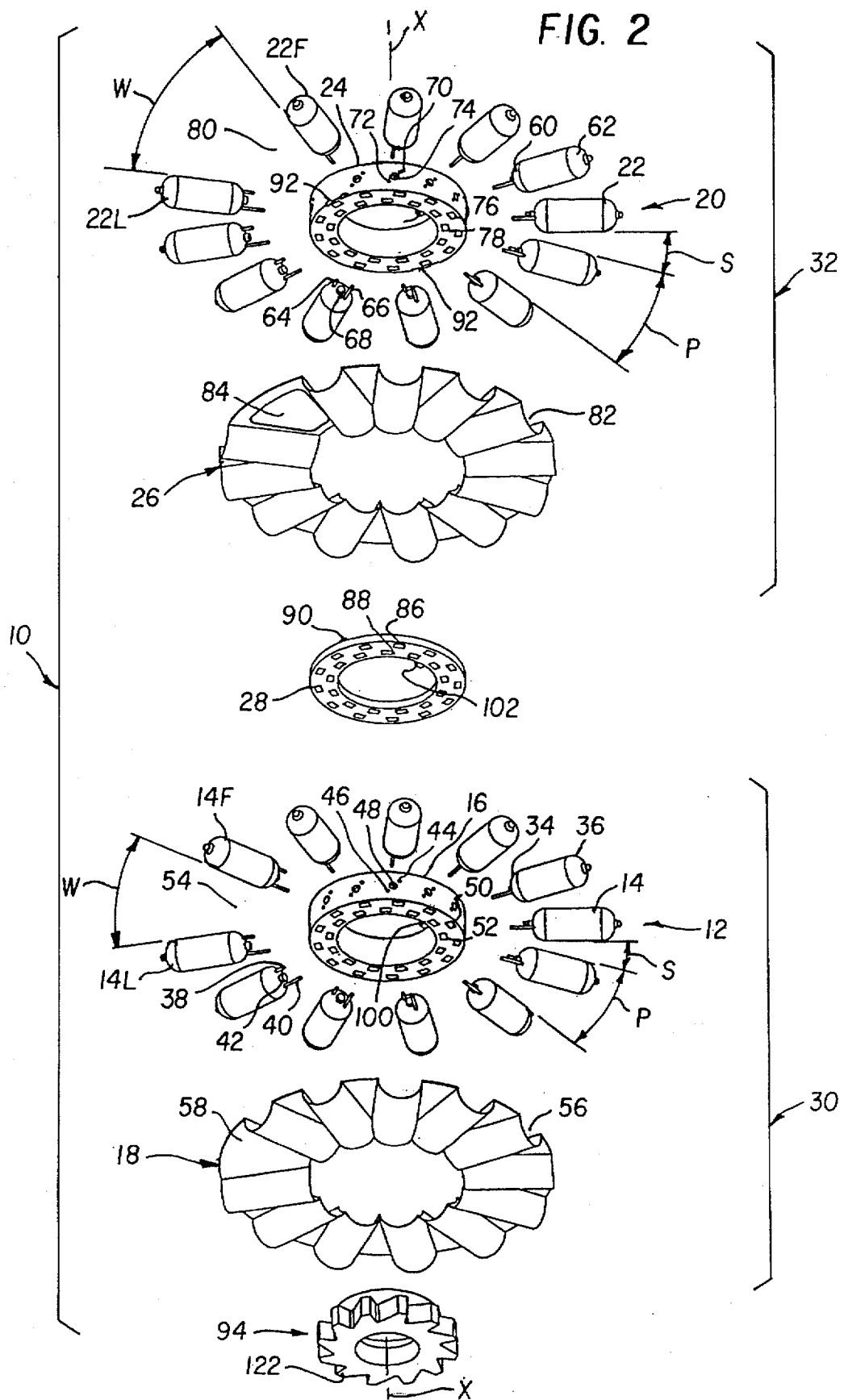
FIG. 2 is an exploded perspective view of the multi-lamp flash assemblage as seen from a different viewing angle than in FIG. 1.

The flash lamps 14 in the first circular array 12 as shown in FIGS. 1 and 2 are arranged radially about the first annular support 16 with respective ignition (inner) ends 34 of the lamps relatively close to one another and respective opposite (outer) ends 36 relatively far from one another. Each one of the flash lamps 14 has a pair of short and long ignition stems or ferrules 38 and 40 and an integral bead 42 projecting from the ignition end 34 of the lamp. The individual pairs of short and long ignition stems 38 and 40 are received in respective pairs of shallow and deep circumferential holes 44 and 46 in the first annular support 16, and the individual beads 42 are received in respective circumferential holes 48 in the first annular support, to hold the flash lamps 14 in the first circular array 12. Respective pairs of electrical ignition contacts 50 and 52 partially imbedded in the first annular support 16 extend in opposite directions from the individual pairs of short and long ignition stems 38 and 40 to the exterior-top and the exterior-bottom of the first annular support. The individual pairs of electrical ignition contacts 50 and 52 are intended to be electrically contacted one at a time at the exterior-bottom of the first annular support 16 to ignite the corresponding lamps 14 in the first circular array 12, when the first multi-lamp wheel 30 is rotated clockwise in FIG. 1 and counter-clockwise in FIG. 2 about the axis X.

The flash lamps 14 in the first circular array 12 as shown in FIGS. 1 and 2 are evenly spaced from one another, i.e. they have the same pitch P, except for a lamp gap 54 between the first lamp 14F to be used and the last lamp 14L to be used in the first circular array. The width W of the lamp gap 54 is equal to the pitch P+the space S between the respective lamps 14.

The flash lamps 14 in the first circular array 12 are a known electrical type in that they comprise a hermetically sealed transparent glass or plastic housing, a combustion-supporting gas fill such as oxygen inside the housing, a filamentary combustible material such as shredded zirconium or hafnium foil which is rapidly burned inside the housing to produce flash illumination, and a primer bead connected inside the housing to the individual pairs of short and long ignition stems 38 and 40.

The first reflector ring 18 as shown in FIGS. 1 and 2 is located immediately behind the first circular array 12 of flash lamps 14. Respective scalloped (concave) portions 56 of the first reflector ring 18 extend radially over each one of the flash lamps 14 between the ignition (inner) ends 34 and opposite (outer) ends 36 of the lamps to reflect flash illumination from the lamps non-radially, i.e. from between the ignition (inner) ends and opposite (outer) ends of the lamps. A flat portion 58 of the first reflector ring 18 substantially fills the lamp gap 54.

The flash lamps 22 in the second circular array 20 as shown in FIGS. 1 and 2 are arranged radially about the second annular support 24 with respective ignition (inner) ends 60 of the lamps relatively close to one another and respective opposite (outer) ends 62 relatively far from one another. Each one of the flash lamps 22 has a pair of short and long ignition stems or ferrules 64 and 66 and an integral bead 68 projecting from the ignition end 60 of the lamp. The individual pairs of short and long ignition stems 64 and 66 are received in respective pairs of shallow and deep circumferential holes 70 and 72 in the second annular support 24, and the individual beads 68 are received in respective circumferential holes 74 in the second annular support, to hold the flash lamps 22 in the second circular array 20. Respective pairs of electrical ignition contacts 76 and 78 partially imbedded in the second annular support 24 extend in opposite directions from the individual pairs of short and long ignition stems 64 and 66 to the exterior-top and the exterior-bottom of the second annular support.

The flash lamps 22 in the second circular array 20 as shown in FIGS. 1 and 2 are evenly spaced from one another, i.e. have the same pitch P, except for a flash through-space 80 between the first lamp 22F to be used and the last lamp 22L to be used in the second circular array. The width W of the flash through-space 80 is equal to the pitch P+the space S between the respective lamps 22.

The flash lamps 22 in the second circular array 20 are a known electrical type in that they comprise a hermetically sealed transparent glass or plastic housing, a combustion-supporting gas fill such as oxygen inside the housing, a filamentary combustible material such as shredded zirconium or hafnium foil which is rapidly burned inside the housing to produce flash illumination, and a primer bead connected inside the housing to the individual pairs of short and long ignition stems 64 and 66.

The second reflector ring 26 as shown in FIGS. 1 and 2 is located immediately behind the second circular array 20 of flash lamps 22. Respective scalloped (concave) portions 82 of the second reflector ring 26 extend radially over each one of the flash lamps 22 between the ignition (inner) ends 60 and opposite (outer) ends 62 of the lamps to reflect flash illumination from the lamps non-radially, i.e. from between the ignition (inner) ends and opposite (outer) ends of the lamps. A flash through-opening 84 in the second reflector ring 26 is located within the flash through-space 80.

Respective pairs of electrical bridge contacts 86 and 88 partially imbedded in the intermediate annular support 28 extend in opposite directions to the exterior-top and the exterior-bottom of the intermediate annular support. The intermediate annular support 28 and the second annular support 24 have respective protuberances 90 and notches 92 which, when engaged, position the individual pairs of electrical bridge contacts 86 and 88 and the individual pairs of electrical ignition contacts 76 and 78 out of alignment, i.e. slightly apart from one other, to prevent them from touching at the exterior-top of the intermediate annular support and the exterior-bottom of the second annular support. The individual pairs of electrical bridge contacts 86 and 88 and the individual pairs of electrical ignition contacts 76 and 78 must be prevented from touching at the exterior-top of the intermediate annular support 28 and the exterior-bottom of the second annular support 24 to prevent the flash lamps 22 in the second circular array 20 from being ignited, when the individual pairs of electrical ignition contacts 50 and 52 are electrically contacted one at a time at the exterior-bottom of the first annular support 16 to ignite the corresponding lamps 14 in the first circular array 12.

After the flash lamps 14 (beginning with the first lamp 14F and ending with the last lamp 14L) in the first circular array 12 are used, the protuberances 90 and the notches 92 are disengaged to permit the individual pairs of electrical bridge contacts 86 and 88 and the individual pairs of electrical ignition contacts 76 and 78 to be aligned to touch each other at the exterior-top of the intermediate annular support 28 and the exterior-bottom of the second annular support 24. Then, when the individual pairs of electrical ignition contacts 50 and 52 touch the individual pairs of electrical bridge contacts 86 and 88 at the exterior-top of the first annular support 16 and the exterior-bottom of the intermediate annular support 28, and they are electrically contacted one at a time at the exterior-bottom of the first annular support, the corresponding lamps 22 in the second circular array 20 will be ignited.

Figure 3:
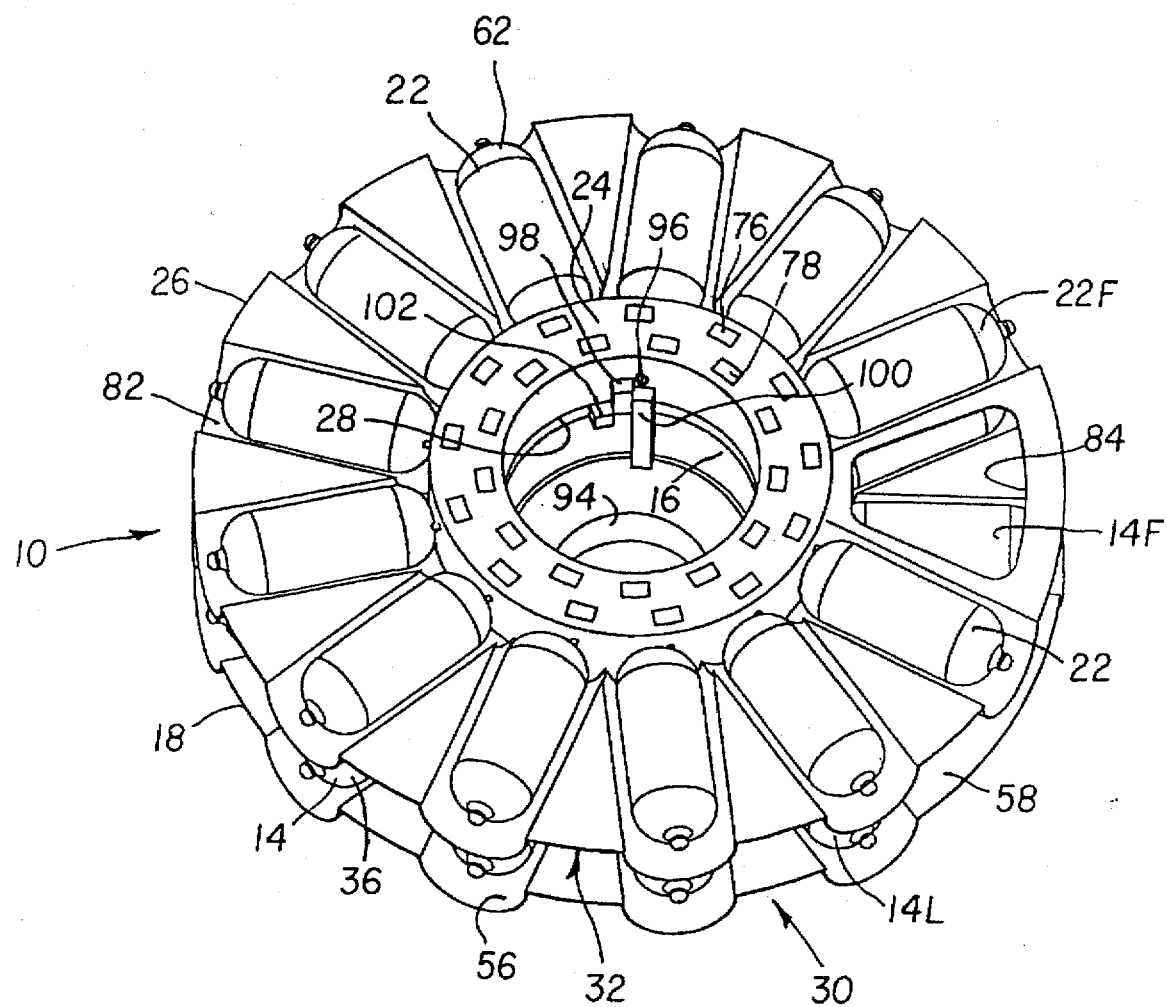
FIGS. 3, 4 and 5 are assembled perspective views of the multi-lamp flash assemblage depicting its various stages of operation.

Originally, as shown in FIGS. 1–3, the first multi-lamp flash wheel 30 is arranged relative to the second multi-lamp flash wheel 32 with the first lamp 14F in the first circular array 12 positioned opposite the flash through-opening 84 in the second reflector ring 26. The individual pairs of electrical ignition contacts 50 and 52 are touching the individual pairs of electrical bridge contacts 86 and 88 at the exterior-top of the first annular support 16 and the exterior-bottom of the intermediate annular support 28. However, the protuberances 90 and the notches 92 are engaged to maintain the individual pairs of electrical bridge contacts 86 and 88 slightly spaced from the individual pairs of electrical ignition contacts 76 and 78 at the exterior-top of the intermediate annular support 28 and the exterior-bottom of the second annular support 24. This prevents the respective lamps 22 in the second circular array 20 from being ignited.

To ignite the first lamp 14F in the first circular array 12, the particular pair of electrical ignition contacts 50 and 52 for that lamp are electrically contacted at the exterior-bottom of the first annular support 16. Then, an indexing hub 94 coaxially connected to the first multi-lamp flash wheel 30 is incrementally rotated clockwise in FIGS. 1 and 3 to similarly rotate the first multi-lamp flash wheel relative to the second multi-lamp flash wheel 32 and the intermediate annular support ring 28 to position the next lamp 14 (following the first lamp 14F) in the first circular array 12 opposite the flash through-opening 84 in the second reflector ring 26. A spring-urged holding pawl 96 (not a part of the multi-lamp assemblage 10) is located in front of a tab 98 on the second annular support 24 to prevent the second multi-lamp flash wheel 32 from being rotated with the first multi-lamp flash wheel 30. See FIG. 3. The engagement of the protuberances 90 and the notches 92 prevents the intermediate annular support 28 from being rotated with the first multi-lamp flash wheel 30.

The multi-lamp flash wheel 30 is rotated successive increments relative to the second multi-lamp flash wheel 32 to position the successive lamps 14 in the first circular array 12 opposite the flash through-opening 84, and a tab 100 on the first annular support 16 is progressively moved from one side of the tab 98 on the second annular support 24 towards another side of that tab. As the tab 100 nears the tab 98 it pushes a tab 102 on the intermediate annular support 28 beneath the tab 98, to slightly rotate the intermediate annular support to move the protuberances 90 out of engagement with the notches 92 and bring the individual pairs of electrical bridge contacts 86 and 88 into alignment with the individual pairs of electrical ignition contacts 76 and 78 to make them touch each other at the exterior-top of the intermediate annular support 28 and the exterior-bottom of the second annular support 24. See FIG. 4, which shows the last lamp 14L in the first circular array 12 moved from opposite the flash through-opening 84 and the flat portion 58 of the first reflector ring 18 moved to opposite the flash through-opening. At this time, the individual pairs of electrical ignition contacts 50 and 52 and the individual pairs of electrical bridge contacts 86 and 88 touch each other at the exterior-top of the first annular support 16 and the exterior-bottom of the intermediate annular support 28.

Figure 4:
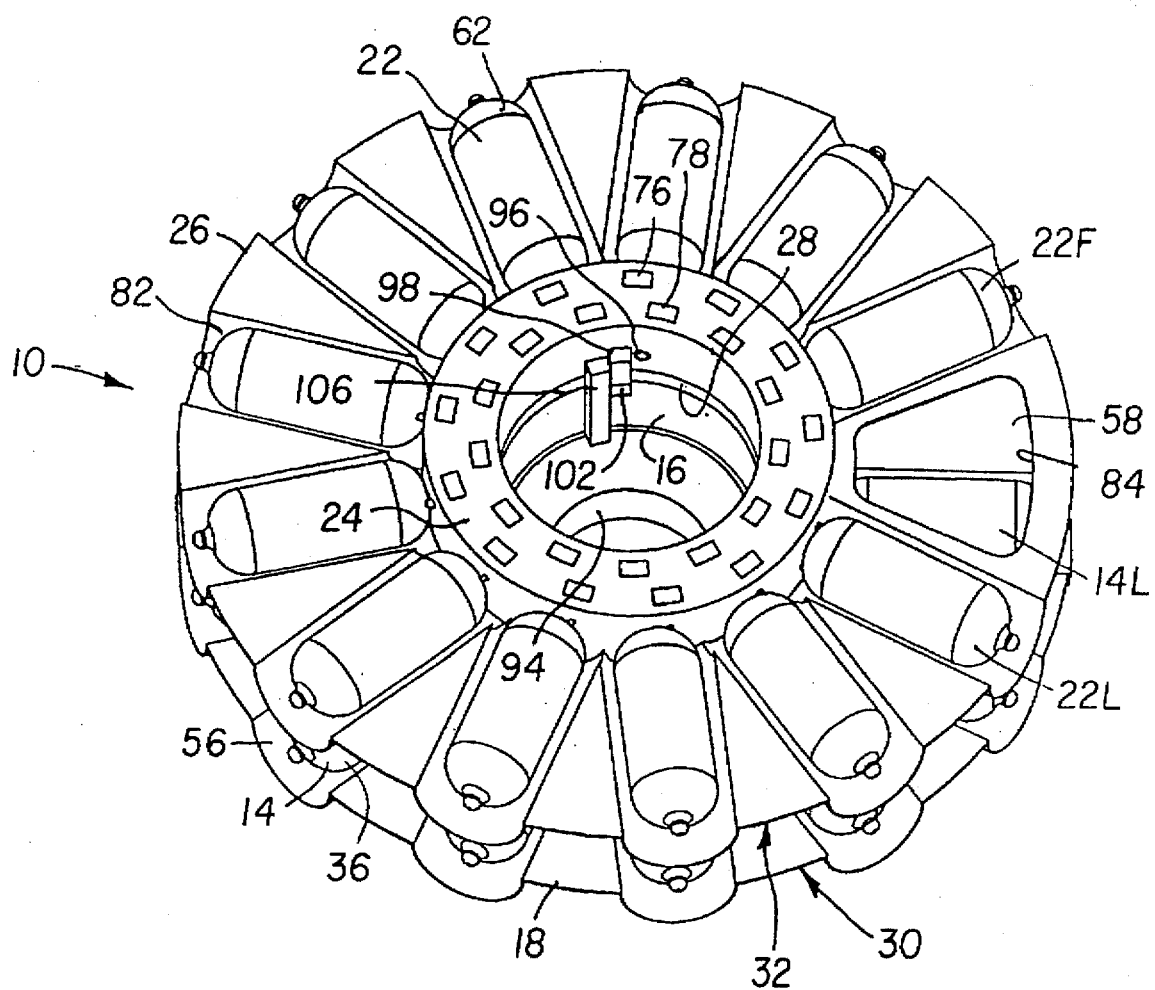
Figure 5:
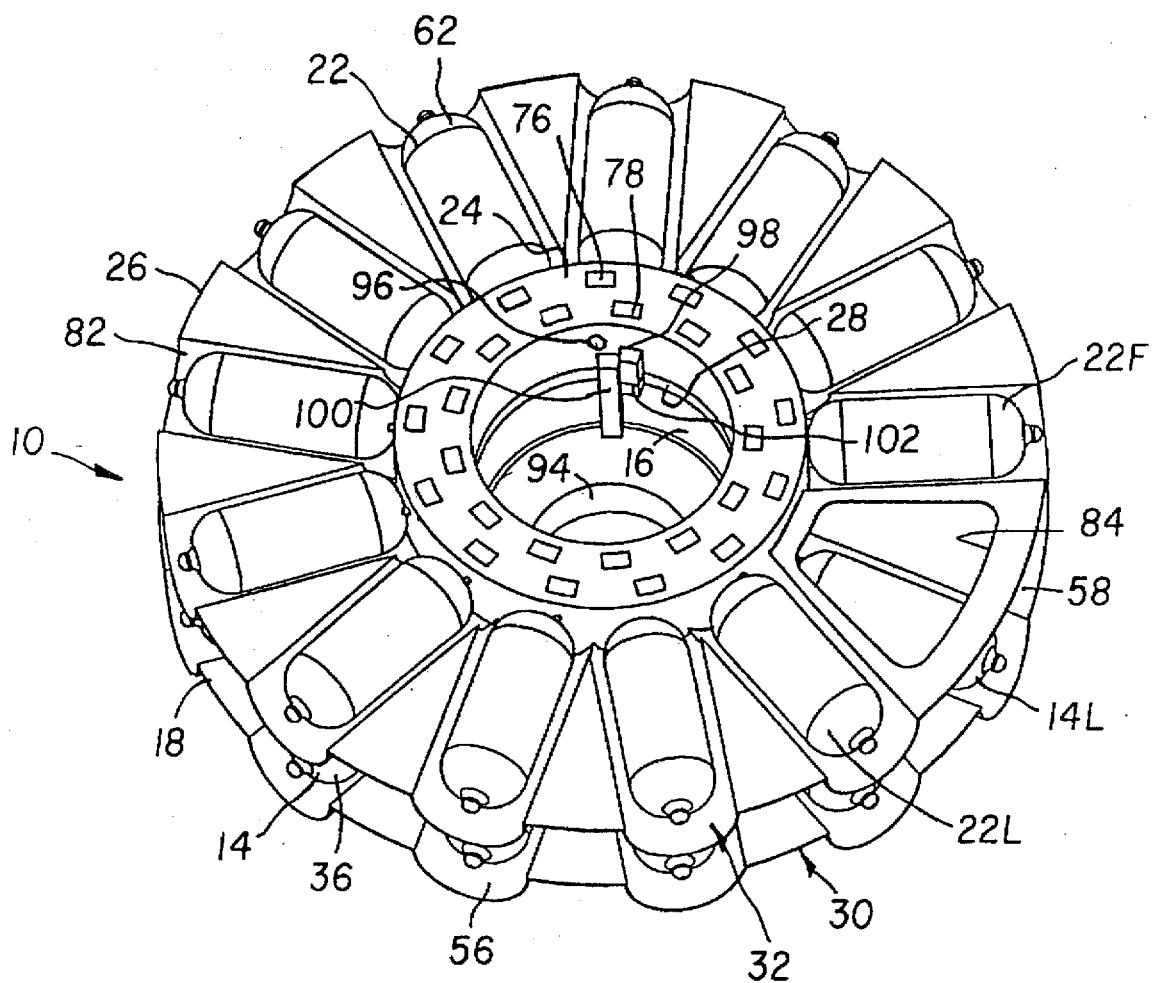

FIG. 5 goes one step further than FIG. 4 in that it shows the first multi-lamp wheel 30, the intermediate annular support 28 and the second multi-lamp wheel 32 rotated in unison to ignite the successive lamps 22 (beginning with the first lamp 22F and ending with the last lamp 22L) in the second circular array 20. The tab 100, which is rotated with the first multi-lamp wheel 30, pushes the tabs 98 and 102 to rotate the second multi-lamp flash wheel 32 and the intermediate annular support 28. The spring-urged holding pawl 96 is pushed out of the way by the tab 98.

The Camera

Figure 6:
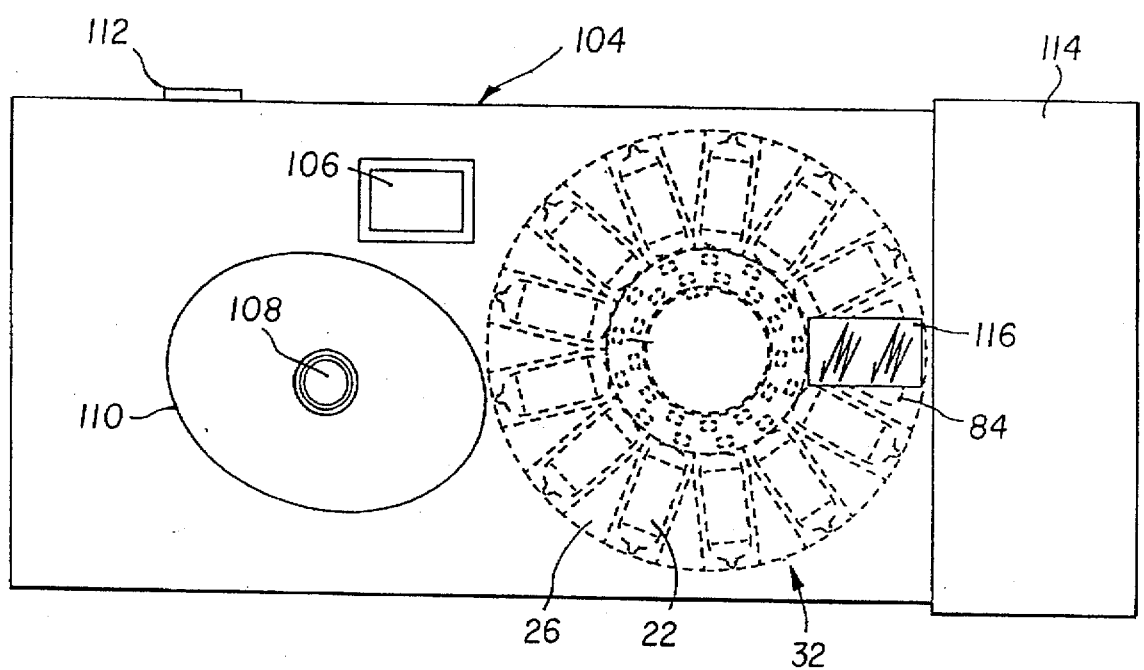
FIG. 6 is a front elevation view of a camera to be used with the multi-lamp flash assemblage.
Figure 7:
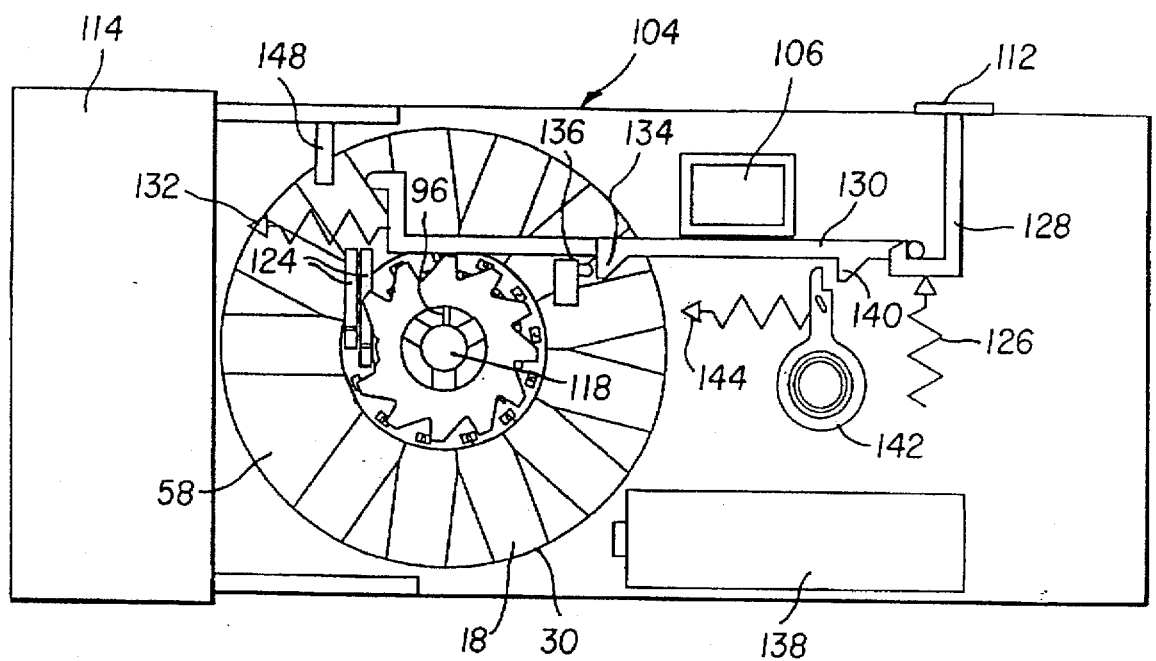
FIG. 7 is a rear elevation view of the camera with a rear cover removed to show a trigger means for igniting the respective lamps.
Figure 8:
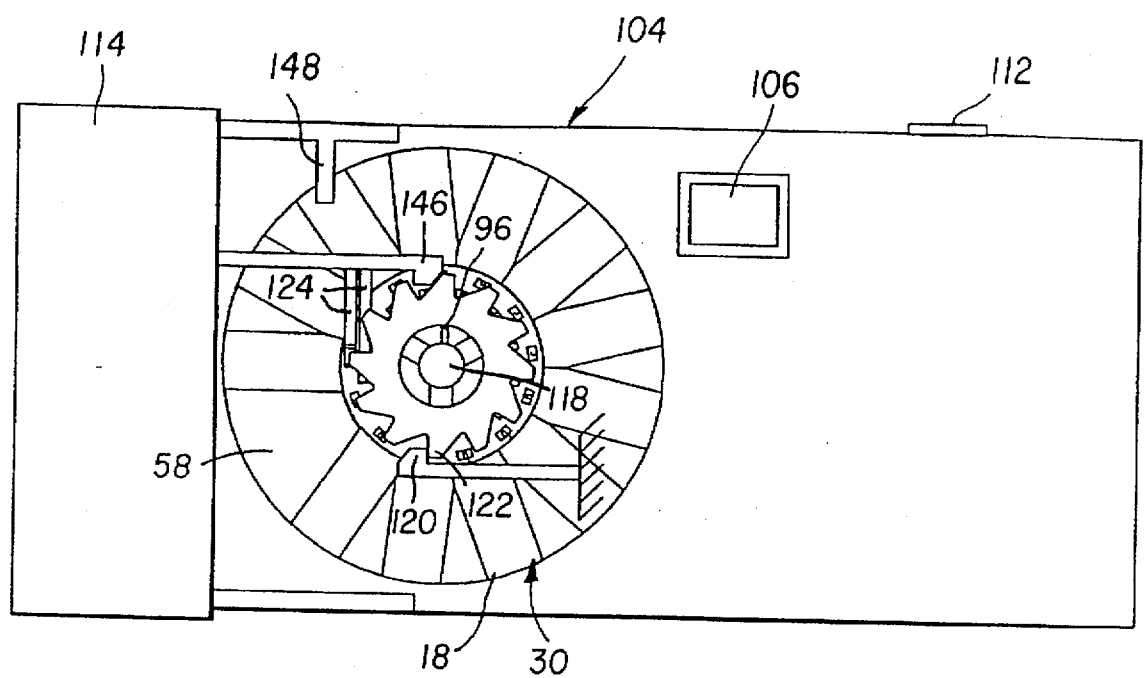
FIG. 8 is a rear elevation view of the camera with the rear cover removed to show an indexing means for the multi-lamp flash assemblage.

A camera 104 which includes the multi-lamp flash assemblage 10 is shown in FIGS. 6–8.

As shown in FIG. 6, the camera 104 has a front viewfinder window 106, a taking lens 108, a front lens bezel 110 surrounding the taking lens, a manually depressible shutter release button 112, an operating push handle 114 and a flash emission window 116.

A rotatably supported shaft 118 which includes the spring-urged holding pawl 96, shown in FIG. 7, coaxially engages the indexing hub 94 to support the first multi-lamp flash wheel 30 for rotation without the intermediate annular support 28 and the second multi-lamp wheel 32 about the axis X and to support the first multi-lamp flash wheel, the intermediate annular support and the second multi-lamp wheel for rotation in unison about the axis, to first move the flash lamps 14 (ending with the last lamp 14L) in the first circular array 12 and then move the second flash lamps 22 (beginning with the first lamp 22F and ending with the last lamp 22L) in the second circular array 20 successively behind the flash emission window 116. An anti-backup pawl 120 engages successive teeth 122 of the indexing hub 94. See FIG. 8. A pair of electrical brushes 124 are provided for electrically contacting the individual pairs of electrical ignition contacts 50 and 52 one at a time at the exterior-bottom of the first annular support 16.

When the shutter release button 112 is manually depressed against the contrary urging of a return spring 126, a release stem 128 connected to the button is disengaged from a high-energy beam 130. The high energy beam 130, in turn, is urged via an actuation spring 132 to the left in FIG. 7, first moving an integral tab 134 of the beam to close an ignition switch 136 to complete an electrical connection between the pair of brushes 124 and a battery 138 in order to ignite whichever one of the flash lamps 14 or 22 is behind the flash emission window 116. Then, an integral tab 140 of the beam 130 is moved against a shutter blade 142 to pivot the shutter blade counter-clockwise against the contrary urging of a return spring 144 to momentarily uncover the taking lens 108 in timed relation with flash ignition.

To reset, the push handle 114 is moved to the right in FIGS. 7 and 8, initially to make an indexing pawl 146 of the push handle engage one of the teeth 122 of the indexing hub 94 to rotate the indexing hub one tooth increment to rotate the first multi-lamp flash wheel 30 without the intermediate annular support 28 and the second multi-lamp wheel 32 about the axis X or to rotate the first multi-lamp flash wheel, the intermediate annular support and the second multi-lamp wheel in unison about the axis, to move the next one of the flash lamps 14 or 22 behind the flash emission window 116. Then, a reset extension 148 of the push handle 114 is moved to push the high-energy beam 130 to re-position the high-energy beam as shown in FIG. 7.

The invention has been described with reference to a preferred embodiment. However, it will be appreciated that variations and modifications can be effected by a person of ordinary skill in the art without departing from the scope of the invention. For example, the flash lamps can be any known flash illumination source such as a conventional flash bulb, a flash powder or solid encased in a transparent covering as disclosed in prior art U.S. Pat. No. 3,751,656, issued Aug. 3, 1973, etc.

PARTS LIST 10. multi-lamp flash assemblage
12. first circular array 14. flash lamps
14F. first lamp
14L. last lamp
16. first annular support
18. first reflector ring
20. second circular array
22. flash lamps
22F. first lamp
22L. last lamp
24. second annular support
26. second reflector ring
28. intermediate annular support
30. first multi-lamp flash wheel
32. second multi-lamp flash wheel
X axis
34. ignition ends
36. opposite ends
38. short ignition stems
40. long ignition stems
42. beads
44. shallow holes
46. deep holes
48. holes
50. ignition contact
52. ignition contact
P pitch
54. lamp gap
W width
S space
56. scalloped portions
58. flat portion
60. ignition ends
62. opposite ends
64. short ignition stems
66. long ignition stems
68. beads
70. shallow holes
72. deep holes
74. holes
76. ignition contacts
78. ignition contacts
80. flash through-space
82. scalloped portions
84. flash through-opening
86. bridge contacts
88. bridge contacts
90. protuberances
92. notches
94. indexing hub
96. holding pawl
98. tab
100. tab
102. tab
104. camera
106. viewfinder window
108. taking lens
110. lens bezel
112. shutter release button
114. push handle
116. flash emission window
118. shaft
120. anti-backup pawl
122. teeth
124. brushes
126. return spring
128. release stem
130. high-energy beam
132. actuation spring
134. tab
136. ignition switch
138. battery
140. tab
142. shutter blade
144. return spring
146. indexing pawl
148. reset extension

We claim:

1. A multi-lamp flash assemblage comprising:

a first group of successive flash lamps;

a second group of successive flash lamps; and means supporting said first lamp group for movement relative to said second lamp group to move the respective lamps of the first lamp group to a use position, and for automatically causing said first and second lamp groups to be moved in unison only after the respective lamps of the first lamp group have been used in order to move the respective lamps of the second lamp group to a use position.

2. A multi-lamp flash assemblage comprising:

a first circular array of flash lamps;

a second circular array of flash lamps having a flash through-space located between two successive lamps of said second circular array; and means supporting said first circular array for rotation relative to said second circular array to align the respective lamps of the first circular array successively with said flash through-space of the second circular array in order to permit the respective lamps of the first circular array to illuminate through the flash through-space of the second circular array, and for allowing the second circular array to be rotated after the respective lamps of the first circular array have been used in order to use the respective lamps of the second circular array.

3. A multi-lamp flash assemblage as recited in claim 2, wherein a reflector ring is located between said first circular array and said second circular array and has a flash through-opening at said flash through-space.

4. A multi-lamp flash assemblage as recited in claim 2, wherein said flash lamps in the first circular array and said flash lamps in the second circular array have the same pitch, and said flash through-space adjoins the first lamp to be used and the last lamp to be used in the second circular array and separates said first and second lamps in the second circular array a greater distance than said pitch.

5. A multi-lamp flash assemblage as recited in claim 2, wherein said means supports said first and second circular arrays to be rotated coaxially in order to use the respective lamps of the first and second circular arrays.

6. A multi-lamp assemblage as recited in claim 5, wherein said means includes a first support for said first circular array having electrical contacts for igniting said flash lamps of the first circular array and a second support for said second circular array having electrical contacts for igniting said flash lamps of the second circular array which are aligned continuously coaxially with said electrical contacts of the first support when the second circular array is rotated coaxially with the first circular array and are not aligned continuously coaxially with the electrical contacts of the first support when the first circular array is rotated relative to the second circular array.

7. A multi-lamp assemblage as recited in claim 5, wherein said means includes a first support for said first circular array having electrical contacts for igniting said flash lamps of the first circular array and a second support for said second circular array having electrical contacts for igniting said flash lamps of the second circular array, and an intermediate support is located between said first support and said second support and has electrical contacts which are aligned with said electrical contacts of the first support and said electrical contacts of the second support when said second circular array is rotated coaxially with said first circular array and are not aligned with the electrical contacts of the second support when the first circular array is rotated relative to the second circular array.

8. A multi-lamp flash assemblage as recited in claim 7, wherein said first support is connected to said first circular array to rotate coaxially with that circular array, said second support is connected to said second circular array to rotate coaxially with that circular array, and said means causes said intermediate support to rotate coaxially with the first and second supports when the means causes the second circular array to be rotated coaxially with the first circular array.

9. A camera for use with a first group of successive flash lamps and with a second group of successive flash lamps, said camera comprising:

a flash emission window; and means for moving the first lamp group relative to the second lamp group to move the respective lamps of the first lamp group to a use position at said flash emission window, and for automatically causing the first and second lamp groups to be moved in unison only after the respective lamps of the first lamp group have been used in order to move the respective lamps of the second lamp group to a use position at said flash emission window.

10. A camera for use with a first circular array of flash lamps and with a second circular array of flash lamps having a flash through-space located between two successive lamps, said camera comprising:

a flash emission window;

a post for supporting the first and second circular arrays with the flash through-space of the second circular array behind said flash emission window; and means for rotating the first circular array for rotation relative to the second circular array on said post to align the respective lamps of the first circular array with the flash through-space of the second circular array in order to permit the respective lamps of the first circular array to illuminate through the flash through-space at said flash emission window, and for rotating the second circular array on the post after the respective lamps of the first circular array have been used in order to use the respective lamps of the second circular array at said flash emission window.

* * * * *